US011091052B2

(12) United States Patent
Hocke et al.

(10) Patent No.: US 11,091,052 B2
(45) Date of Patent: Aug. 17, 2021

(54) WIRELESS CHARGING STATION DEVICE WITH FREQUENCY SELECTION AND VEHICLE POSITION DETERMINATION

(71) Applicant: Bayerische Motoren Werke Aktiengesellschaft, Munich (DE)

(72) Inventors: Fredrik Hocke, Munich (DE); Josef Krammer, Holzkirchen (DE); Helmut Wagatha, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 16/400,076

(22) Filed: May 1, 2019

(65) Prior Publication Data
US 2019/0255965 A1    Aug. 22, 2019

Related U.S. Application Data

(63) Continuation of application No. PCT/EP2017/076753, filed on Oct. 19, 2017.

(30) Foreign Application Priority Data

Nov. 2, 2016  (DE) ..................... 10 2016 221 474.8

(51) Int. Cl.
*B60L 53/34* (2019.01)
*B60L 53/38* (2019.01)
(Continued)

(52) U.S. Cl.
CPC ............. *B60L 53/34* (2019.02); *B60L 53/305* (2019.02); *B60L 53/36* (2019.02); *B60L 53/38* (2019.02);
(Continued)

(58) Field of Classification Search
CPC ........ B60L 53/34; B60L 53/305; B60L 53/36; B60L 53/38; H02J 7/0027; Y02T 10/70;
(Continued)

(56) References Cited

U.S. PATENT DOCUMENTS 10,069,334 B2    9/2018  Barbul et al.
10,177,593 B2    1/2019  Turner et al.
(Continued)

FOREIGN PATENT DOCUMENTS

DE    10 2013 222 227 A1    4/2015
DE    10 2013 225 241 A1    6/2015
(Continued)

OTHER PUBLICATIONS

International Search Report (PCT/ISA/210) issued in PCT Application No. PCT/EP2017/076753 dated Feb. 22, 2018 with English translation (seven pages).
(Continued)

Primary Examiner — Nathaniel R Pelton
(74) Attorney, Agent, or Firm — Crowell & Moring LLP

(57) ABSTRACT

A charging station facility is provided having one or more charging stations for wirelessly transmitting electric energy to a vehicle. Each charging station includes a base unit which is designed to generate an electromagnetic charging field during a charging process in order to transmit electric energy to the vehicle and a transmitting and/or receiving unit which is designed to receive a request signal from a transmission unit of a vehicle or to transmit the request signal to a receiving unit of the vehicle. The request signal lies in any range of a plurality of different frequency ranges. The receiving unit is additionally designed to ascertain a signal strength of the received request signal. The charging station facility additionally includes a control and communication unit which is designed to transmit a message to a control unit (Continued)

of the vehicle and to a control unit of the receiving unit of the charging station selected for the charging process, wherein the message includes information on which selected frequency range the request signal is to be transmitted.

15 Claims, 7 Drawing Sheets

(51) Int. Cl.
  *H02J 7/00* (2006.01)
  *B60L 53/36* (2019.01)
  *B60L 53/30* (2019.01)
(52) U.S. Cl.
  CPC .............. *H02J 7/0027* (2013.01); *Y02T 10/70* (2013.01); *Y02T 10/7072* (2013.01); *Y02T 90/12* (2013.01); *Y02T 90/14* (2013.01); *Y02T 90/16* (2013.01)
(58) Field of Classification Search
  CPC ..... Y02T 10/7072; Y02T 90/12; Y02T 90/14; Y02T 90/16
  USPC .................................................. 320/108, 109
  See application file for complete search history.

(56)  References Cited

U.S. PATENT DOCUMENTS

| | | | |
|---|---|---|---|
| 10,259,334 | B2 | 4/2019 | Krammer et al. |
| 2008/0232316 | A1 | 9/2008 | Cho et al. |
| 2011/0202476 | A1 | 8/2011 | Nagy et al. |
| 2012/0153894 | A1 | 6/2012 | Widmer |
| 2012/0239571 | A1* | 9/2012 | Boot ................. B60L 53/65 705/44 |
| 2012/0281547 | A1* | 11/2012 | Kim ..................... H02J 50/50 370/242 |
| 2013/0038424 | A1* | 2/2013 | Katar .................. H04H 20/71 340/5.8 |
| 2014/0035526 | A1* | 2/2014 | Tripathi .............. B60L 53/126 320/109 |
| 2014/0320260 | A1 | 10/2014 | Van Wiemeersch et al. |
| 2015/0042168 | A1* | 2/2015 | Widmer ............... H04B 5/0037 307/104 |
| 2015/0057884 | A1 | 2/2015 | Bongiorno et al. |
| 2017/0008410 | A1* | 1/2017 | Krammer ............... B60L 53/39 |
| 2017/0015206 | A1 | 1/2017 | Herzog |
| 2017/0223750 | A1* | 8/2017 | Turner .................. H04W 4/40 |
| 2019/0084525 | A1* | 3/2019 | Ignaczak ............... G01S 7/022 |

FOREIGN PATENT DOCUMENTS

| | | |
|---|---|---|
| DE | 10 2014 205 672 A1 | 10/2015 |
| DE | 10 2014 206 379 A1 | 10/2015 |
| DE | 10 2014 221 559 * | 4/2016 |
| DE | 10 2014 221 559 A1 | 4/2016 |
| EP | 2 362 362 A1 | 8/2011 |
| KR | 10-1559693 B1 | 10/2015 |
| WO | WO 2014/005621 A1 | 1/2014 |
| WO | WO 2015/144335 * | 10/2015 |
| WO | WO 2015/144335 A1 | 10/2015 |
| WO | WO 2016/043911 A1 | 3/2016 |

OTHER PUBLICATIONS

German-language Written Opinion (PCT/ISA/237) issued in PCT Application No. PCT/EP2017/076753 dated Feb. 22, 2018 (seven pages).
German-language Search Report issued in counterpart German Application No. 10 2016 221 474.8 dated Oct. 2, 2017 with partial English translation (12 pages).

* cited by examiner

WIRELESS CHARGING STATION DEVICE WITH FREQUENCY SELECTION AND VEHICLE POSITION DETERMINATION

CROSS REFERENCE TO RELATED APPLICATIONS

This application is a continuation of PCT International Application No. PCT/EP2017/076753, filed Oct. 19, 2017, which claims priority under 35 U.S.C. § 119 from German Patent Application No. 10 2016 221 474.8, filed Nov. 2, 2016, the entire disclosures of which are herein expressly incorporated by reference.

BACKGROUND AND SUMMARY OF THE INVENTION

The invention relates to a charging station facility having one or more charging stations for the wireless transfer of electrical energy to a vehicle, to a vehicle, and to a method for determining the position of the vehicle in relation to a charging station of a charging station facility.

Vehicles having an electric drive typically have a battery in which electrical energy is able to be stored in order to operate an electric motor of the vehicle. The battery of the vehicle is able to be charged with electrical energy from a power supply grid. To this end, the battery is coupled to the power supply grid in order to transfer the electrical energy from the power supply grid into the battery of the vehicle. The coupling may be performed in a wired manner (via a charging cable) and/or wirelessly (by way of inductive coupling between a charging station and the vehicle).

An approach involving the automatic, wireless inductive charging of the battery of the vehicle consists in electrical energy being transferred to a battery of the vehicle from the ground to the underbody of the vehicle through magnetic induction, over an underbody clearance 120. This is illustrated by way of example in FIG. 1. FIG. 1 shows a vehicle 100 having a store 103 for electrical energy (for example having a rechargeable battery 103). The vehicle 100 comprises what is known as a secondary coil in the vehicle underbody, the secondary coil being connected to the store 103 via a matched impedance, not shown, and a rectifier 101. The secondary coil is typically part of what is known as a "wireless power transfer" (WPT) vehicle unit 102.

The secondary coil of the WPT vehicle unit 102 may be positioned above a primary coil, the primary coil being installed for example on the floor of a garage, a parking lot or a layby or parking space. The primary coil is typically part of what is known as a WPT ground unit 111. The primary coil is connected to a power supply 110 (also referred to as a charging unit 110 in this document). These units together form a charging station. The power supply 110 may comprise a radiofrequency generator that generates an AC (alternating current) current in the primary coil of the WPT ground unit 111, as a result of which a magnetic field is induced. This magnetic field is also referred to as an electromagnetic charging field in this document. The electromagnetic charging field may have a predefined charging field frequency range. The charging field frequency range may be situated in the LF (low-frequency) range, for example between 80 kHz and 90 kHz, or another LF range.

When there is sufficient magnetic coupling between the primary coil of the WPT ground unit 111 and the secondary coil of the WPT vehicle unit 102 over the underbody clearance 120, a corresponding voltage and therefore also a current is induced in the secondary coil by way of the magnetic field. The induced current in the secondary coil of the WPT vehicle unit 102 is rectified by the rectifier 101 and stored in the store 103. The electrical energy is thus able to be transferred wirelessly from the power supply 110 to the store 103 of the vehicle 100. The charging procedure may be controlled in the vehicle 100 by a charging controller 105 (also referred to as a WPT controller 105). To this end, the charging controller 105 may be configured so as to communicate wirelessly with the charging unit 110 (for example a wall box) or with the WPT ground unit 111, for example.

For an effective energy transfer by way of the electromagnetic charging field, it is necessary for the WPT vehicle unit 102 to be positioned relatively accurately above the WPT ground unit 111. This positioning may be supported by determining the position of the vehicle 100 in relation to the WPT ground unit.

To this end, the charging unit 110 may have a reception unit that is configured so as to receive a request signal from a transmission unit of a vehicle. The request signal may comprise a request signal for a keyless access function and/or a keyless engine starting function of a vehicle. If the reception unit is configured so as to determine a signal strength of the received request signal, then the signal strength of the respective request signal may be used to determine the position of the vehicle that transmitted the request signal in relation to the charging unit, and in particular in relation to the WPT ground unit 111.

If a plurality of charging stations are combined so as to form a charging station facility, then there is the danger of the communication between a respective charging station and a vehicle driving the charging station being subjected to mutual interference. This is the case for example when vehicles drive or use adjacent charging stations for the purpose of inductive charging.

The problem furthermore exists that a charging station, in particular an electromagnetic charging field generated by the WPT ground unit 111, that interfere with request signals emitted by a transmission unit of an adjacent vehicle.

The object of the invention is to provide a charging station facility having one or more charging stations for the wireless transfer of electrical energy to a respective vehicle, which charging stations allow interference-free communication in order to precisely determine the position of a vehicle at an associated charging station.

According to a first aspect, a charging station facility having one or more charging stations for the wireless transfer of electrical energy to a respective vehicle (for example a vehicle having an electric drive) is described. The vehicle may be in particular a land vehicle, for example a passenger car, a truck or a motorcycle. A respective charging station comprises a ground unit that is configured so as to generate an electromagnetic field for the transfer of electrical energy to the (associated) vehicle during a charging procedure. A respective ground unit may in particular comprise a primary coil that is configured so as to generate the electromagnetic charging field.

A respective charging station furthermore comprises a transmission and/or reception unit that is configured so as to receive a request signal from a transmission unit of a vehicle or so as to transmit same to a reception unit of the vehicle. The request signal may in particular comprise a request signal of a keyless access function and/or of a keyless engine starting function of a vehicle. The transmission and/or reception unit may be arranged on or in the ground unit of a respective charging station. As an alternative or in addition, the transmission and/or reception unit may be arranged on a charging unit (for example on a wall box) of the respective charging station.

The transmission and/or reception unit may be configured such that the request signal is situated in any one of a multiplicity of different frequency ranges. The transmission and/or reception unit may therefore be configured so as to receive or so as to transmit request signals that are each situated in one of a multiplicity of different frequency ranges. The transmission and/or reception unit may furthermore be configured so as to determine a signal strength of the request signal received from the vehicle. If the reception unit of the vehicle evaluates the request signal, this may be configured so as to determine a signal strength of the request signal received from the charging station. The signal strength of the received request signal may be used to determine the position of the vehicle that transmitted the request signal in relation to a particular charging station of the charging station facility, and in particular in relation to the ground unit thereof.

The charging station facility furthermore comprises a control and communication unit. The control and communication unit may be a computer that manages and/or controls the one or more charging stations. In addition to this, the control and communication unit has the option of exchanging messages with one or more receivers. The receiver or receivers may be a vehicle and/or a charging station.

The control and communication unit is configured so as to transmit a message to a control unit of the vehicle and to a control unit of the transmission and/or reception unit of the charging station selected for the charging procedure, the message comprising information as to the selected frequency range in which the request signal should be transmitted.

Due to the fact that the charging station facility comprises a control and communication unit, it is possible to operate a plurality of adjacently arranged charging stations without in the process encountering problems due to mutual interference during signal exchange between reception units and transmission units of the vehicle on account of identical or overlapping frequency ranges. This is made possible by virtue of the fact that there is assignment of a frequency range, defined beforehand by the control and communication unit, in which messages (for example the request signal and a response signal) are exchanged between a transmission unit of the vehicle and the reception unit of an associated charging station. By virtue of the organization of the multiplicity of frequency ranges and assignment to charging stations and vehicles by the control and communication unit, a situation whereby mutual interference occurs on account of the use of an identical frequency range is able to be avoided.

As described at the outset, the transmission and/or reception unit of a respective charging station may be arranged on or in the ground unit. In particular, the transmission and/or reception unit may be fixed at a fixed position and/or have a fixed orientation in space. The transmission and/or reception unit may then be configured so as to individually evaluate the individual directional components of a reception field (for example an X, Y and Z component) for the purpose of better resolution. As a result, the quality of the reception of the one or more request signals of a vehicle associated with the charging station is able to be increased.

To determine the signal strength, the transmission and/or reception unit of a respective charging station may be configured so as to receive a signal (for example an analog electrical signal) that comprises the request signal. The transmission and/or reception unit of a respective charging station may further be configured so as to condition and/or so as to process the received signal depending on the frequency range (also referred to as selected frequency range in this document), predefined by the control and communication unit, of the request signal. In particular, a frequency component of the received signal that is situated in the predefined frequency range of the request signal may be isolated in order to determine the conditioned signal. The signal strength of the request signal may then be determined on the basis of the conditioned signal. As a result, precise determination of the signal strength of the request signal is made possible, which in turn allows precise position determination of the vehicle that transmitted the request signal. Since vehicles of adjacent charging stations transmit a request signal in a different frequency range, a mutual interfering influence is able to be avoided.

The control and communication unit may be configured, according to one refinement, so as to transmit the message to the control unit of the vehicle via a communication channel that is situated in a frequency range different from the multiplicity of different frequency ranges in which the request signal is transmitted. A wireless communication connection, such as for example WLAN (wireless local area network) or Bluetooth, may be used as communication channel, for example. As a result, the message containing the information about the frequency range to be used for the communication is transmitted on a redundant communication channel. A further advantage consists in that the frequency range used for this communication channel may be selected such that the communication is already able to be performed over a large distance before the vehicle approaches the charging station. The vehicle therefore has the option of setting the frequency range to be used in a timely manner and of transmitting the corresponding request signal in a timely manner for reception by the transmission and/or reception unit of the associated charging station.

The control and communication unit may be configured, according to a further refinement, to transmit information, in respective messages, about the use of different frequency ranges to vehicles that are associated with adjacent ground units for the wireless transfer of electrical energy. In this way, it is able to be ensured that mutual influencing of the communication between the vehicle and the associated charging station does not occur, or only occurs extremely rarely. To ensure this, the control and communication unit may assign a respective frequency range to be used to particular charging stations, for example, the frequency ranges of charging stations situated next to one another being selected so as to be different.

It may furthermore be provided for the multiplicity of different frequency ranges to be situated in one of the following frequency bands, which are in particular spaced apart from and above and/or spaced apart from and below a predefined charging field frequency range:

a first frequency band between a lower limit value, which is at least 10 kHz higher than an upper limit of an energy transfer frequency range (for example 100 kHz), and 250 kHz;

a second frequency band between 20 kHz and an upper limit value, which is at least 10 kHz lower than a lower limit of the energy transfer frequency range (for example 70 kHz).

In these two exemplary frequency bands, it is assumed that the electromagnetic charging field is in a frequency range between 80 kHz and 90 kHz. Due to the defined first and second frequency bands, it is ensured that the frequency ranges used for communication are sufficiently spaced from the frequency range of the electromagnetic charging field. At the same time, the first and the second frequency band are wide enough to provide a sufficient number of frequency ranges for the transmission of the request signal.

In this connection, it may be expedient to arrange the multiplicity of frequency ranges so as to be evenly distributed in the first or second frequency band. The width of a respective frequency range may be roughly 6 times a given fundamental frequency of the signal coding. The spacing between two adjacent frequency ranges may be roughly 9 times the given fundamental frequency of the signal coding. This results in a robust design for the proposed charging station facility. The spacing from the frequency range of the electromagnetic charging field is sufficiently large. The spacing of adjacent carrier frequencies in the first or second frequency band is large, and the sidebands are in this case able to be kept narrow. By way of example, when using the first frequency band, six channels may be provided, having the following carrier frequencies: channel 0: 110 kHz; channel 1: 117.5 kHz; channel 2: 125 kHz; channel 3: 132.5 kHz; channel 4: 140 kHz; channel 5: 147.5 kHz. A frequency of 0.5 kHz may be selected as fundamental frequency of the signal coding, for example. This results in a width of a respective frequency range of +/−1.5 kHz around the respective carrier frequency, at a spacing of the sidebands of 4.5 kHz.

The transmission and/or reception unit of a respective charging station may comprise a reception unit that is configured so as to convert an electromagnetic field (which comprises the request signal) into an analog signal (for example the received signal). The reception unit of a respective charging station may furthermore comprise a signal conditioning unit that is configured so as to damp the analog electrical signal in a charging field frequency range of the electromagnetic charging field in relation to the analog electrical signal in the selected frequency range. This means that the signal conditioning unit may be configured so as to reduce the component, based on an electromagnetic charging field, of the received signal in terms of its signal strength in relation to other signal components. As a result, inaccuracies when determining the signal strength of the request signal, which stem from an electromagnetic charging field, are able to be reduced or avoided. The accuracy of the position determination of the vehicle in relation to the charging station assigned thereto therefore increases.

The transmission and/or reception unit of a respective charging station may furthermore be configured so as to match the signal conditioning unit to the frequency range of the request signal. In particular, the signal conditioning unit may be adjusted such that a component, based on the request signal, of the received signal is highlighted in relation to other components. As a result, the signal-to-noise ratio is able to be improved and the sensitivity and range of the system are thus able to be increased.

As an alternative, the transmission and/or reception unit of a respective charging station may be configured so as to damp the analog electrical signal in the charging field frequency range in relation to the analog electrical signal in all of the multiplicity of different frequency ranges, and so as to damp the analog electrical signal in the selected frequency range to a lesser extent than in the other frequency ranges of the multiplicity of different frequency ranges. The signal conditioning unit may therefore be designed so as to be static, and the signal components of all possible ones of the multiplicity of different frequency ranges may be highlighted in relation to the selected signal component in the charging field frequency range.

The transmission and/or reception unit of a respective charging station may furthermore comprise an analog-to-digital converter that is configured so as to convert a signal, derived from the analog electrical signal, into a digital signal. The reception unit may furthermore comprise a filter unit that is configured so as to highlight the digital signal in the selected frequency range in relation to the digital signal in the other ones of the multiplicity of different frequency ranges. In particular, the component of the digital signal that is situated in the frequency range of the request signal may be isolated and/or highlighted.

The transmission and/or reception unit may furthermore comprise a determination unit that is configured so as to determine a signal strength of a signal at the output of the filter unit. The signal at the output of the filter unit may primarily comprise components of the received signal. The signal strength of the request signal may therefore be determined in a precise manner.

The filter unit may comprise a digital filter having a fixed fundamental frequency that is a carrier frequency of the selected frequency range. The charging station, after receiving the message from the control and communication unit in which the selected frequency range of the request signal to be used is transmitted, may then set or filter the frequency range used by the vehicle in a targeted manner.

The transmission and/or reception unit of a respective charging station, according to a further refinement, may be configured, in response to the reception of the request signal from a transmission unit of the vehicle to which electrical energy is intended to be transferred via the ground unit, so as to provide the determined signal strength in order to determine a position of the vehicle in relation to the ground unit. In particular, the determined signal strength may be transmitted to the vehicle in order to allow the vehicle to position itself above the associated ground unit. According to a further refinement, the ground unit may convert the signal into a position in Cartesian coordinates or polar coordinates and transmit this to the vehicle.

According to a second aspect, a vehicle is described that comprises a store that is able to be charged through the wireless transfer of electrical energy from a charging station. The vehicle comprises a vehicle unit that is configured, during a charging procedure, so as to receive an electromagnetic charging field from a ground unit of a charging station. The vehicle further comprises a reception unit that is configured so as to receive a position determination signal or a coordinate from the ground unit, wherein the position determination signal is situated in any one of a multiplicity of different frequency ranges. The position determination signal, which is a response signal in response to a request signal transmitted by the vehicle, comprises a determined signal strength in order to determine a position of the vehicle in relation to the ground unit. By way of the information contained in the position determination signal, the vehicle is able to position itself above the ground unit. The vehicle lastly comprises a control unit that is configured so as to receive a message from a control and communication unit of a charging station facility as described in this document, the message comprising information as to the selected frequency range in which a request signal should be transmitted from the vehicle to the reception unit of the ground station, or vice versa.

The vehicle may further comprise one or more transmission units having a respective or a common signal conditioning unit that is configured so as to convert a digital electrical signal into an analog electrical signal, wherein the signal conditioning unit is configured so as to be matched to a carrier frequency of the selected frequency range by the control unit.

In other words, the vehicle that is described is distinguished in that the request signal, transmitted by the transmission unit or transmission units, is transmitted at a carrier frequency of the selected frequency range that is specified in the message from the control and communication unit of the charging station facility. As a result, the charging station facility is able to define the frequency at which a plurality of vehicles transmit their respective request signals to an associated charging station of the charging station facility. Interference due to signal transmissions from adjacent vehicles and/or charging stations is thereby reliably able to be avoided.

According to a further aspect, a method for determining the position of a vehicle in relation to a charging station of a multiplicity of charging stations of a charging station facility as described in this document is described. The method comprises recognition of the approach of the vehicle to one of the multiplicity of charging stations. The method further comprises transmission of a message to a control unit of the vehicle and to a control unit of the reception unit of the charging station selected for the charging procedure, the message comprising information as to the selected frequency range from a multiplicity of different frequency ranges in which the request signal should be transmitted. The method further comprises transmission of the request signal from the vehicle or the charging station, the request signal being situated in the selected frequency range. It lastly comprises reception of a signal at the charging station or at the vehicle, the received signal comprising the request signal. The received signal is conditioned depending on the selected frequency range of the request signal. Lastly, the signal strength of the request signal is determined on the basis of the conditioned signal, and the position in relation to the charging station is determined on the basis of the determined signal strength.

According to a further aspect, a software program is described that may be configured so as to be executed by a processor (for example a controller) and so as thereby to execute the method described in this document.

According to a further aspect, a storage medium is described. The storage medium may comprise a software program that is configured so as to be executed on a processor and so as thereby to execute the method described in this document.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
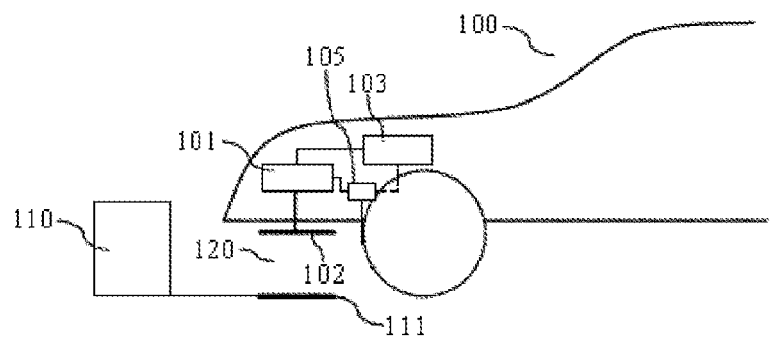
FIG. 1 shows a schematic device for the inductive charging of a vehicle.

As described at the outset in connection with FIG. 1, the present document deals with determining the position of a vehicle 100 in relation to a WPT ground unit 111 of a charging station. More precisely, the present document deals with determining the position of a vehicle 100 in relation to a WPT ground unit 111 when a plurality of such ground units 111 of respective charging stations are arranged adjacent to one another in a charging station facility.

In the context of providing a keyless access function, it is necessary to measure the relative position between a vehicle 100 and a vehicle key. This known principle is adapted and exploited in the method for determining the relative position between a vehicle 100 and a WPT ground unit 111. This allows inexpensive and reliable position determination.

Numerous vehicle manufacturers offer a keyless access function (also referred to as a "smart key") for accessing a vehicle 100. The keyless access function allows a driver, without using the keyless lock principle, to open a vehicle door 210 or to start the engine of the vehicle 100, as illustrated schematically in FIG. 2. To open the door 210, the driver grips the door handle 211. A (for example capacitive) sensor 212 on or in the vicinity of the door handle 211 detects the movement. A specific LF signal (LF: low-frequency) is then transmitted by one or more transmission units 201 of the vehicle 100. This signal may be referred to as a request signal. The one or more transmission units 201 are therefore configured so as to transmit an electromagnetic field (in particular in the LF range) as request signal. Exemplary transmission frequencies of the one or more transmission units 201 are preferably situated between 20 kHz and 70 kHz, and 100 kHz and 150 kHz.

The electromagnetic field transmitted by the transmission unit or plurality of transmission units 201 comprises the request signal, which may comprise several parts. A first part of the request signal may comprise information for the identification of the vehicle 100. One or more further parts may be used to evaluate a signal strength of the transmitted request signal. Part of the request signal may optionally also be designed to wake a reception unit 223 in the key 220 of the driver, that is to say to prepare for the reception of further information. The various parts of the request signal transmitted by the transmission unit or transmission units 201 may be transmitted in a temporally offset manner.

The reception unit 223 in the key 220 is configured so as to receive the signals or signal parts transmitted by the transmission unit or plurality of transmission units 201 and so as to determine the signal strength or signal field strength of the signals or signal parts. A key transmission unit 221 of the key 220 responds to the received request signal with a response signal, which is also referred to in this description as a position determination signal.

The response signal may consist of several parts. A first part of the response signal may serve to identify the key 220, and a further part of the response signal may comprise an identifier for the measured signal strength of the request signal. One or more reception units 204 of the vehicle 100 may receive the response signal and/or the response signal parts and relay them to a controller 202 of the vehicle 100. The controller 202 may be configured so as to check whether the key 220 belongs to the vehicle 100. The position of the key in relation to the vehicle 100 may furthermore be calculated by way of triangulation or by way of a lookup table, this being based on the measured signal strengths of the multiplicity of request signals. If the determined position is within a predefined region around the actuated door handle 211, then the door 210 and/or the entire vehicle 100 is opened.

Figure 2:
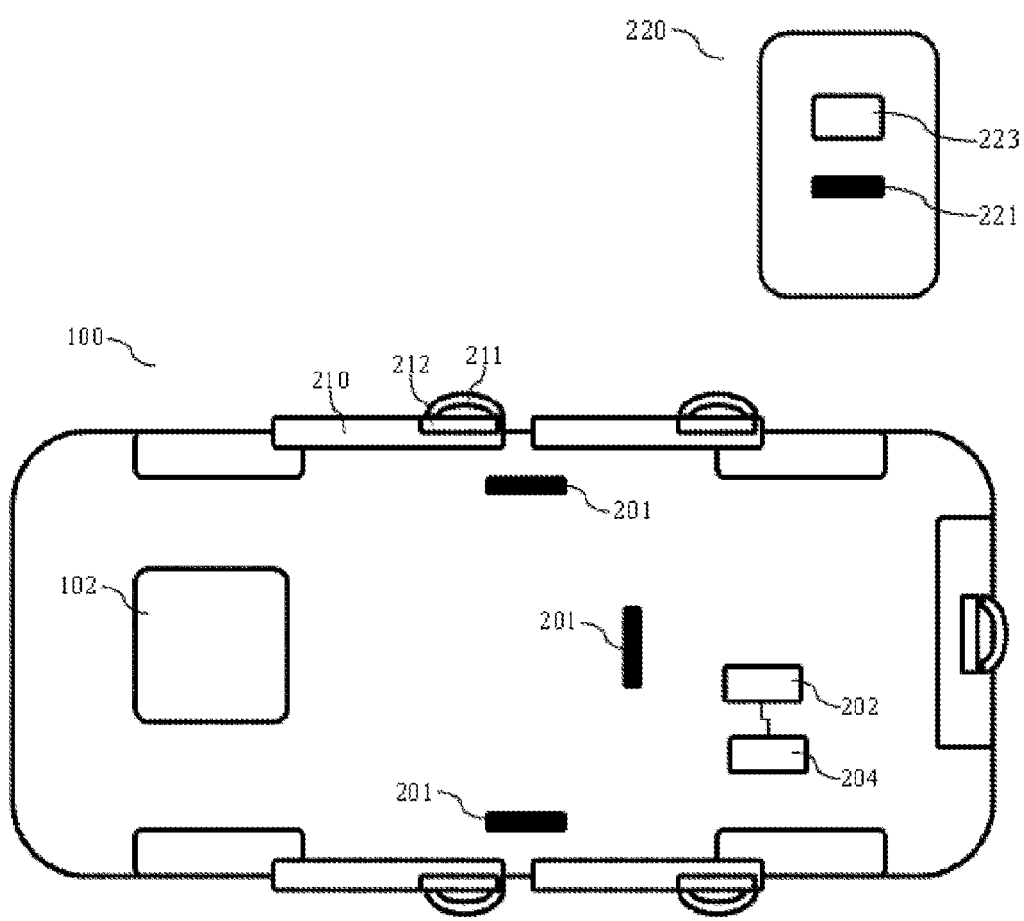
FIG. 2 shows an exemplary vehicle having a secondary coil and a plurality of transmission units for communication with a vehicle key.

As illustrated in FIG. 2, the vehicle 100 typically comprises a multiplicity of transmission units 201. The transmission units 201 may be arranged at different locations in the vehicle 100. Each transmission unit 201 of the multiplicity of transmission units 201 may transmit a request signal (for example a signal pulse). The request signals may be temporally offset with respect to one another and possibly have a predefined order. As an alternative or in addition, the request signals may have a unique identifier. The key 220 and/or the reception unit 204 of the vehicle 100 may each be explicitly assigned to a transmission unit 201 of the multiplicity of transmission units 201 by way of the identifier and/or by way of the order of the request signals. The respective signal strength of the individual request signals and therefore also the respective distance between the transmission unit 201 and the key 220 may thus be determined. As the transmission units 201 are situated at different locations in the vehicle 100, this results in a multiplicity of distances for the corresponding multiplicity of transmission units 201. The relative position between the vehicle 100 and the key 220 is thus able to be determined on the basis of triangulation methods. It is likewise possible to determine an orientation of the vehicle 100 in relation to the key 220.

The abovementioned procedure for identity or position comparison between the vehicle 100 and the key 220 typically lasts for a time interval of less than 100 ms. This means that the abovementioned procedure typically remains unnoticed by the driver due to the short time interval, such that the driver gripping the door handle 211 is immediately able to open the door 210. A similar identity comparison procedure is typically performed when the engine is started.

Figure 3:
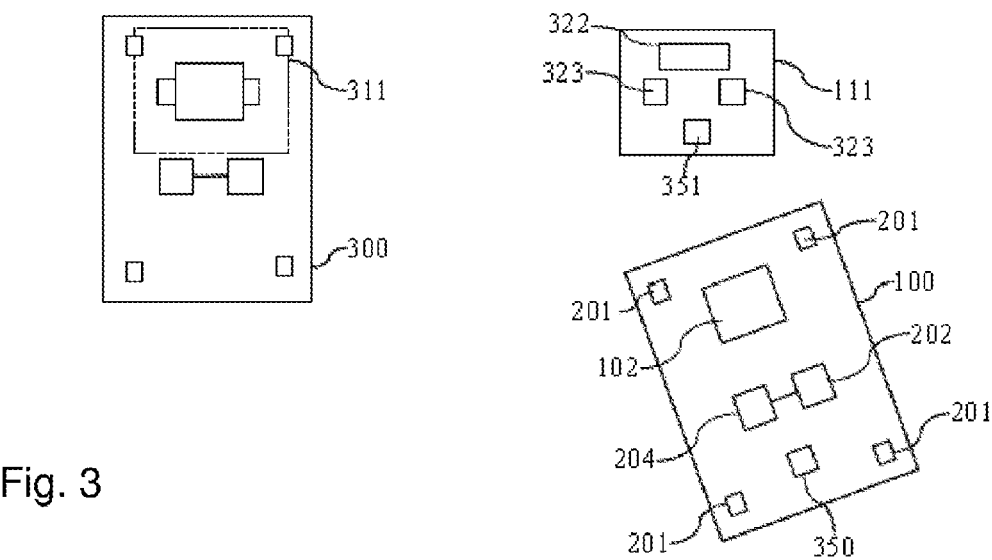
FIG. 3 shows two exemplary ground units arranged next to one another and two vehicles associated with the ground units.

The method for positioning the key 220 in relation to the vehicle 100 may be used in a similar way for the positioning of a vehicle 100 above a ground unit 111. To this end, the ground unit 111 may be provided with one or more reception units 323 (the reception unit 323 may be part of a transmission and/or reception unit; reference is made only to the reception function below, and therefore the reference "reception unit" is used) in a similar way as for the reception unit 223 of the key 220, for the request signals from the transmission units 201 of an approaching vehicle 100. This is illustrated schematically in the right-hand half of FIG. 3. FIG. 3 in particular shows a vehicle 100 that is approaching a ground unit 111 (right-hand side). The vehicle 100 is intended to be positioned such that a distance that is as small as possible between the ground unit 111 and the vehicle unit 102 results. Adjacent to the ground unit 111 there is illustrated a further ground unit 311 above which a further vehicle 300 is already arranged (that is to say parked for the purpose of a charging procedure).

The ground unit 111 illustrated in FIG. 3 comprises two reception units 323 for request signals from the transmission units 201 of the vehicle 100. By virtue of using a multiplicity of reception units 323 that are situated at a corresponding multiplicity of different locations on the ground unit 111, the accuracy of the determination of the position of the vehicle 100 in relation to the ground unit 111 is able to be increased. In principle, however, a single reception unit 323 is sufficient for determining the position and/or the orientation of the vehicle 100 in relation to the ground unit 111 (in particular when the vehicle 100 comprises a multiplicity of transmission units 201). By contrast, one transmission unit 201 is sufficient for completely determining the position in restricted situations when the ground unit 111 comprises a multiplicity of reception units 323.

The controller 202 of the vehicle 100 may be configured so as to initiate the method for positioning the vehicle 100. In particular, the controller 202 may prompt the transmission of request signals from the transmission units 201 of the vehicle 100. The vehicle 100 may comprise a communication unit 350 that is configured so as to communicate with a corresponding communication unit 351 of the ground unit 111 or of the charging unit 110. To this end, the communication unit 350 may use a wireless communication method, such as for example WLAN or Bluetooth. The charging unit 110 is able to communicate with the vehicle 100 by way of the communication unit 350 in order to begin the positioning process by way of the request signals.

The one or more reception units 323 of the ground unit 111 are configured so as to receive the request signals and so as to determine a signal strength of the received request signals and so as to return this to the vehicle 100. The determined signal strengths may be returned in one or more response signals to the reception unit 204 of the vehicle 100, as is the case in the case of the keyless access function. As an alternative or in addition, the determined signal strengths may be transmitted via the communication unit 350, for example via WLAN, to the vehicle 100.

The controller 202 of the vehicle 100 is configured, on the basis of the signal strengths of the request signals, so as to determine the distances between the individual transmission units 201 of the vehicle 100 and the individual reception units 323 of the ground units 111. The position of the vehicle 100 in relation to the ground unit 111 and/or the orientation of the vehicle 100 in relation to the ground unit 111 may then be determined from the distances, for example using triangulation methods.

Determining an accurate position of the vehicle 100 therefore requires precise determination of the signal strength of the request signals. As explained above, the store 103 (battery) of the vehicle 100 is inductively charged by way of generation of an electromagnetic charging field having a particular charging field frequency by the ground unit 111. In this case, the frequency of the charging field is typically situated between 80 kHz and 90 kHz. A current is induced in the WPT vehicle unit 102 by the charging field in the secondary coil. The induced AC current is rectified and filtered, such that an on-board electrical system of the vehicle 100 is able to be supplied and/or the store 103 is able to be charged with the resultant DC current.

The frequency of the charging field for the inductive charging in a range of 80 kHz to 90 kHz is situated in an adjacent frequency range that is used for the transmission of the request signal by the transmission units 201. In this case, for a multiplicity of adjacent charging stations or charging units, it may be the case that the frequencies for the transmission of the request signal and the response signal (position determination signal) interfere with one another. This may have the result that the signal strength of a request signal from a vehicle is not able to be determined with sufficient accuracy.

In a situation in which a plurality of ground units of respective charging stations are arranged adjacent to one another, in order to be able to avoid interference between the ground units and vehicles, which are associated with one another in pairs, it is proposed, rather than to use a fixed or manufacturer-defined frequency for the transmission at least of the request signal, to use a variably assignable frequency. To be able to define beforehand the frequency at which or the frequency band of a multiplicity of frequency bands in which a vehicle 100 approaching a ground unit 111 should transmit the request signal, a control and communication unit associated with the plurality of charging stations is used, which control and communication unit is configured so as to transmit a message to a control unit (for example the controller 202) of the vehicle 100 and a control unit of the reception unit 323 of the charging station 111 selected for the charging procedure, the message comprising the information as to the selected frequency range in which the vehicle should transmit the request signal.

The communication between the (superordinate) control and communication unit and the control unit of the vehicle 100, or the control unit of the reception unit 323 of the charging station 111, is performed by way of a wireless communication method, for example WLAN or Bluetooth. As a result, the frequency range in which, that is to say the carrier frequency at which the transmission units 201 should transmit the request signal to the control unit of the reception unit 323 of the ground unit 111, is able to be defined already before the charging station 111 is reached.

As explained above, an identifier of the vehicle and/or an identifier of the individual transmission unit 201 may be given to an individual transmission procedure of transmitting a request signal. Since vehicles 100, 300 using adjacent ground units 111, 311 (or charging stations) may interfere with one another, the vehicles 100, 300 are assigned different frequency ranges (channels) under the control of the superordinate control and communication unit. Since the different vehicles 100, 300 are now transmitting on different frequencies, the identifier of a respective vehicle and/or the identifier of individual transmission units 201 may be reduced. In one alternative variant, the transmission units 201 of a respective vehicle 100, 300 may be switched on in a defined order and, at the time of synchronization between the vehicle 100, 300 and the associated ground unit 111, 311, a new cycle may be marked with a pause. The remaining assignment results from temporal conditions known to the vehicle 100, 300 and the associated ground unit 111, 311. As a further alternative, depending on the system design, it may be expedient to use a few identifier bits. The number of bits to be transmitted however has a strong influence on the measurement time, the filter expenditure and the bandwidth necessary to transmit the identifier.

Figure 5:
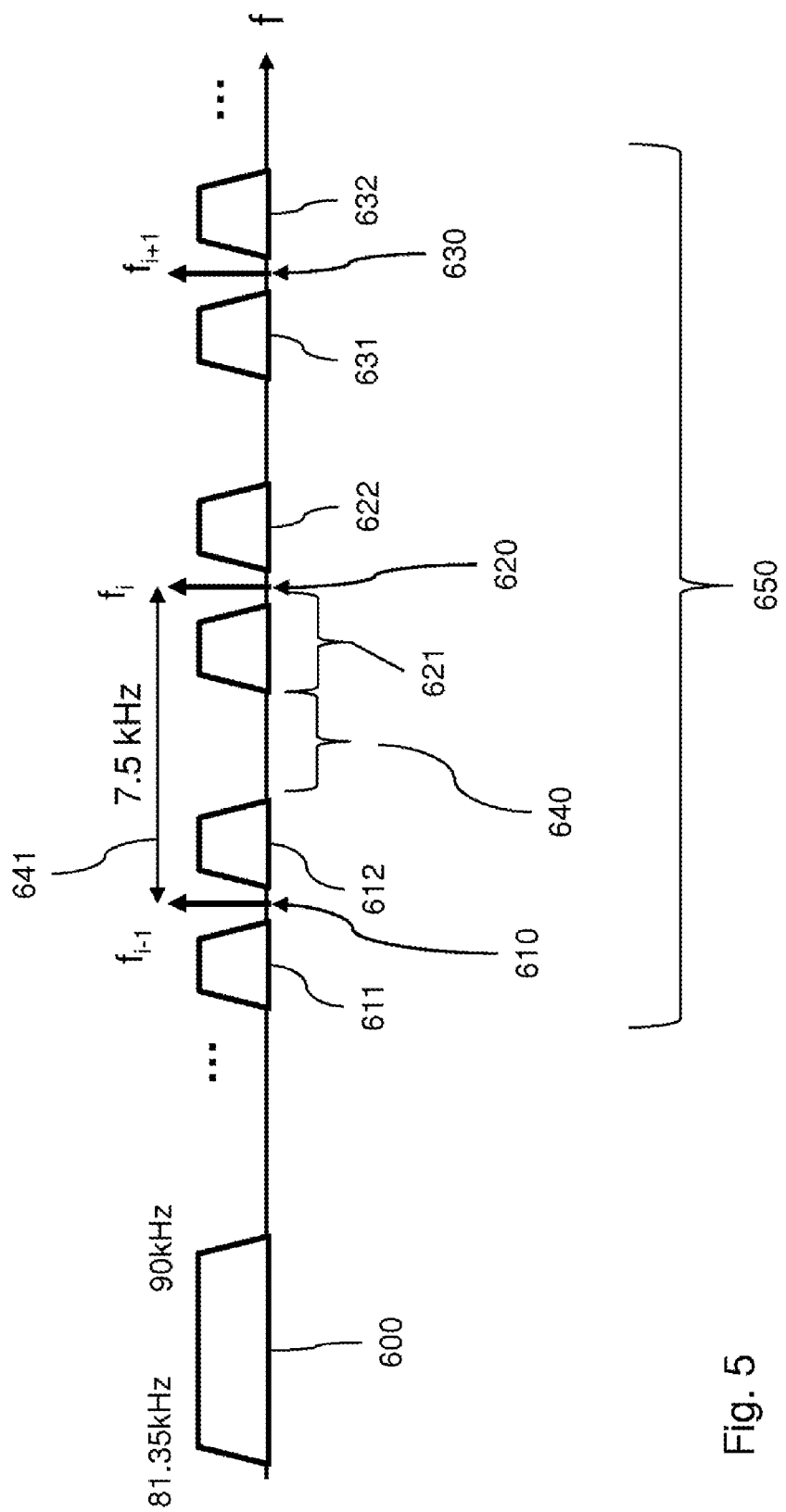
FIG. 5 shows a schematic illustration of the division of a frequency range for a charging field and a multiplicity of different frequency ranges for the transmission of a request signal and a position determination signal.

FIG. 5 shows an exemplary schematic illustration of various frequency ranges that may be used for the dynamic assignment of a frequency range for the transmission of a request signal. The reference sign 600 illustrates the frequency range of the charging field between 80 kHz and 90 kHz. Spaced apart therefrom and provided with the reference sign 650, there is illustrated an exemplary frequency band that comprises for example the frequencies between 100 kHz and 150 kHz. A plurality of carrier frequencies $f_{i-1}$, $f_i$, $f_{i+1}$ are identified with the reference signs 610, 620, 630 and arranged with a respective spacing 641 from one another in the frequency band 650. In said frequency band between 100 kHz and 150 kHz, six carrier frequencies $f_i$ may be distributed at a spacing 641 of 7.5 kHz, by way of example, for example at 110 kHz (channel 0), 117.5 kHz (channel 1), 125 kHz (channel 2), 132.5 kHz (channel 3), 140 kHz (channel 4) and 147.5 kHz (channel 5). Around each of the carrier frequencies 610, 620 and 630 sidebands 611, 612, respectively 621, 622, respectively 631, 632 arise due to the modulation of bit patterns, harmonics and the like. The widths of the sidebands 611, 612; 621, 622; 631, 632 of the carrier frequencies 610, 620, 630 are for example roughly 3 times the fundamental frequency of the signal coding. At a fundamental frequency of f=0.5 kHz, the sidebands 611, 612; 621, 622; 631, 632 are each 1.5 kHz wide. This results in a respective spacing 640 of roughly 4.5 kHz between adjacent carrier frequencies. Such a distribution of the carrier frequencies thus allows six channels, by way of which a respective request signal is able to be transmitted to the associated ground unit without interference. Said width of the frequency band 650 (50 kHz) and the number of carrier frequencies (i=6) allow a robust design in which there is a sufficiently large spacing of the frequency range used for the transmission of the request signal from the charging system frequency range 600, with at the same time a large spacing from the carrier frequencies and a sideband that is as narrow as possible for coding bit patterns.

It is understood that, depending on the number of channels, the width of the frequency band 650 and another fundamental frequency of the signal coding, also other carrier frequencies, carrier frequency spacings and the like are possible.

A frequency changeover, that is to say a one-off definition of the frequency range in which and the carrier frequency at which a vehicle communicates with an associated ground unit, may be performed by parameterizing modulation methods. This enables efficient filtering of adjacent frequency ranges, and in particular of the high-energy charging field frequencies.

Figure 6:
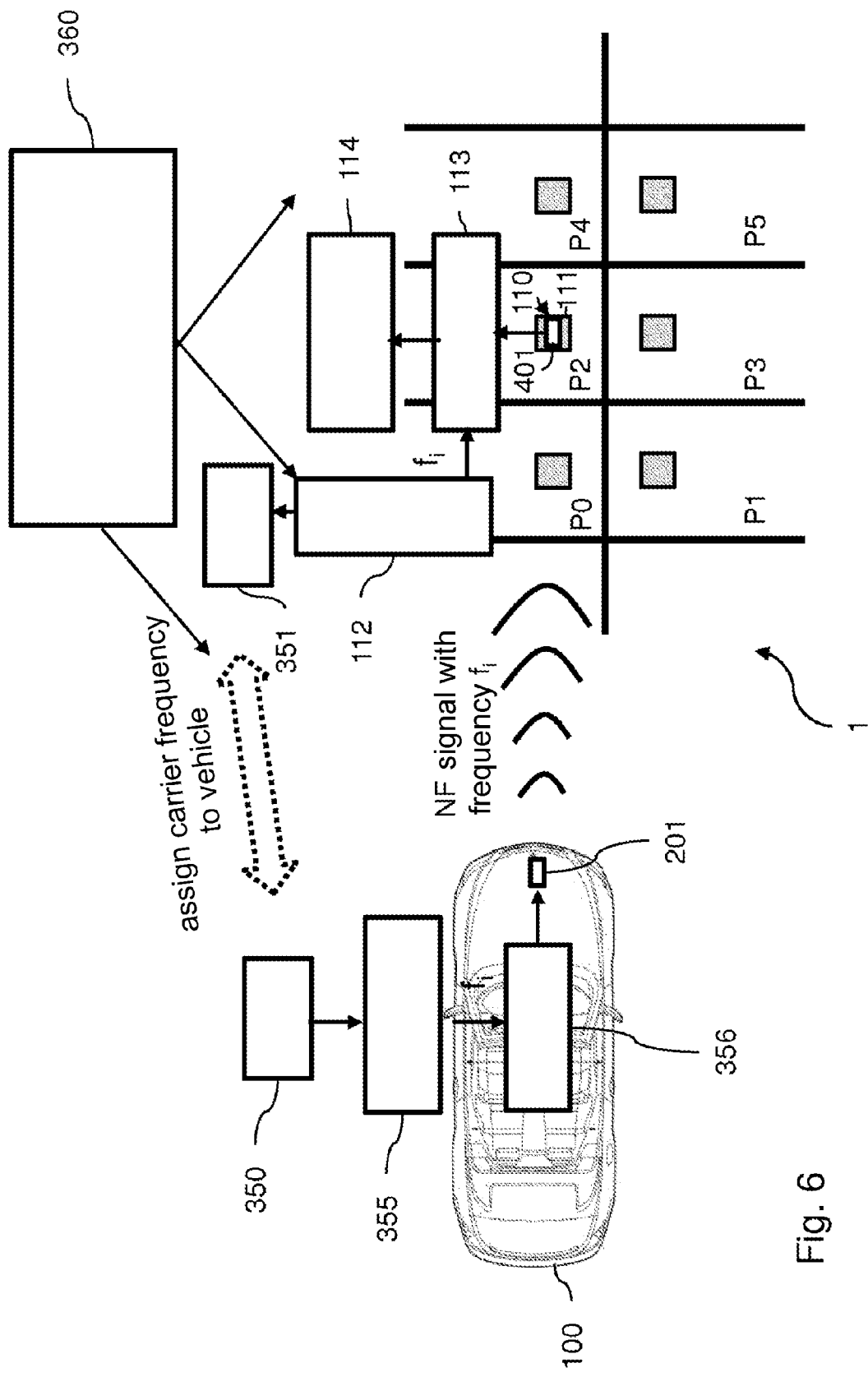
FIG. 6 is a schematic illustration of a charging station facility according to an embodiment of the invention having a plurality of charging stations and a vehicle approaching the charging station facility.

FIG. 6 schematically illustrates this procedure. The charging station facility, identified with the reference sign 1, comprises by way of example six charging stations on parking spaces P0, P2, P4 (upper row) and P1, P3, P5 (lower row) that are arranged opposite one another in pairs. The charging station facility 1 is assigned a superordinate control and communication unit 360. As described above, said control and communication unit is configured, when a vehicle 100 approaches the charging station facility 1, so as to transmit a message to a control unit 355 of the vehicle 100 and a control unit 112 of a charging station 110 (here by way of example in the parking space P2) provided for the charging procedure. To this end, the control and communication unit 360 has a communication means, not illustrated in more detail in the figure, by way of which the control and communication unit 360 transmits the message to a communication unit 350 of the vehicle 100 and the communication unit 351 of the charging station 110, for example via WLAN. By way of example, it is assumed that the parking space P2 having the ground unit 111 is assigned channel 2 at a particular carrier frequency, for example 125 kHz. The control unit 355 of the vehicle 100 drives a modulator 356 of a transmission unit of the vehicle at the corresponding carrier frequency $f_i$. An LF signal emitted by the transmission unit 201 is thereby conditioned such that it is transmitted to a reception coil 401 of the charging station 110 at the frequency $f_i$. Since the control unit 112 of the charging station 110 has also received the frequency range of channel 2 to be used at the carrier frequency $f_i$, the carrier frequency $f_i$ is applied to the demodulator 113. The LF signal (request signal) may thus be evaluated by the signal evaluation unit 114 at the carrier frequency $f_i$.

If a further vehicle, not shown in FIG. 6, approaches the charging station facility 1, then the procedure is repeated in the manner described, another frequency range being selected.

In this case, it may be provided for respective charging parking spaces P0, P2, P4, P1, P3, P5 to be assigned a respective fixed frequency range, that is to say its fixed channel. As an alternative, it may be provided for a current free channel to be selected by the control and communication unit 360, which channel is then used for the signal exchange between the vehicle and the charging station driven by the vehicle.

Figure 7:
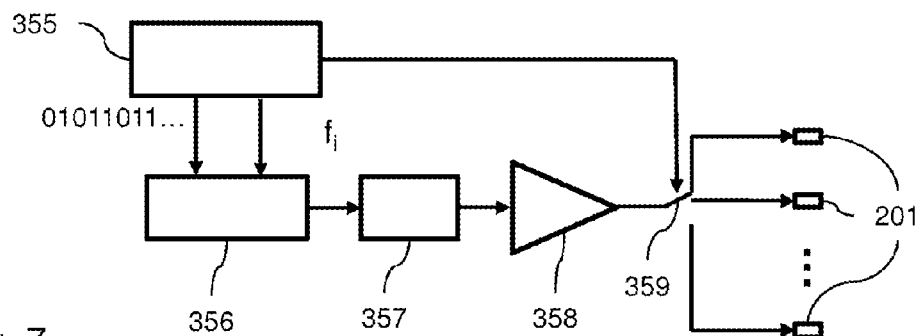
FIG. 7 is a schematic illustration of a transmission unit of a vehicle according to the invention.

An exemplary vehicle-side amplitude modulator having a plurality of vehicle-side transmission units 201 is illustrated by way of example in FIG. 7. The amplitude modulator comprises the control unit 355, already mentioned, which applies the selected carrier frequency ($f_i$) and for example an identifier of the vehicle to the modulator 356, likewise mentioned. By way of example, the identifier may be characterized by the bit pattern "01011011" visible in FIG. 7. If, as an alternative, a request signal should be transmitted to the reception unit of the associated charging station, from which request signal the field strength is able to be determined, the modulator 356 may also be supplied with a constant signal by the control unit 355. The modulator 356 conditions the information supplied thereto and supplies this to a low-pass filter 357. The signal generated by the low-pass filter is supplied to an amplifier 358. The control unit 355 controls, for example cyclically, a switch element 359, so as to transmit a respective request signal for transmission to the charging station to the plurality of transmission units 201.

To ensure that the signal strength of a request signal is able to be determined with sufficient accuracy, signal conditioning is performed in the reception unit of the ground unit 111, by way of which frequency components of the request signal are preferably isolated. In particular, the reception unit may to this end have an analog input filter that is configured so as to filter out the request signal from an electromagnetic field and so as to block (or to damp) other frequencies of the electromagnetic field (in particular the charging field frequency range).

Figure 4:
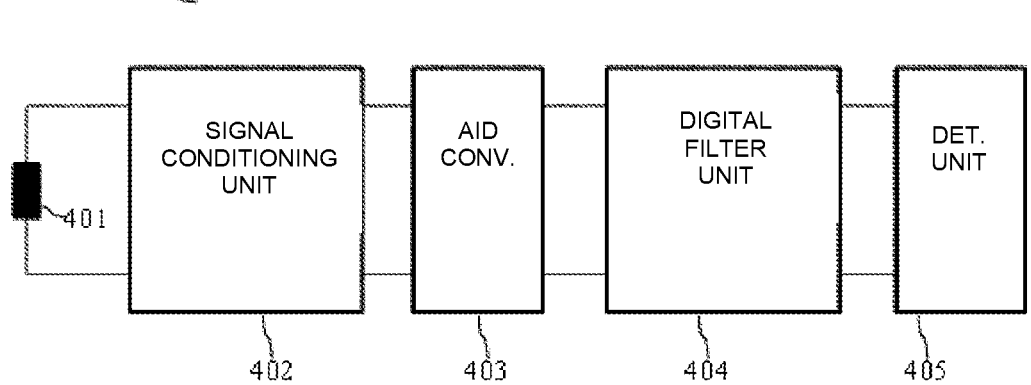
FIG. 4 shows a schematic exemplary reception unit of a ground unit.

FIG. 4 shows a block diagram of an exemplary reception unit 323 for a ground unit 311. The reception unit 323 comprises a reception coil 401 that is configured so as to receive an electromagnetic field, which also comprises the request signal, and to convert it into electric current. The reception unit 323 further comprises a signal conditioning unit 402 that is configured so as to condition the analog electrical signal such that a frequency component of the electromagnetic charging field is damped in relation to the previously stipulated frequency component of the request signal.

The reception unit 323 further comprises an analog-to-digital (A/D) converter 403 that is configured so as to sample the conditioned analog signal and so as to convert it into a digital signal. The sampling frequency used in this case depends on the frequency range (referred to in this document as selected frequency range) defined beforehand by the control and communication unit. The reception unit 323 furthermore comprises a digital filter unit 404 that is configured so as to isolate a specific frequency component of the request signal transmitted by a specific vehicle 100. A digital filter of the digital filter unit 404 may in particular depend on the selected frequency range in which the transmission units 201 of the approaching vehicle 100 transmit their request signal. The reception unit 323 lastly comprises a determination unit 405 that is configured so as to determine a signal strength of a received request signal on the basis of the filtered signal. The determined signal strength may then be transmitted to the vehicle 100.

Figure 8:
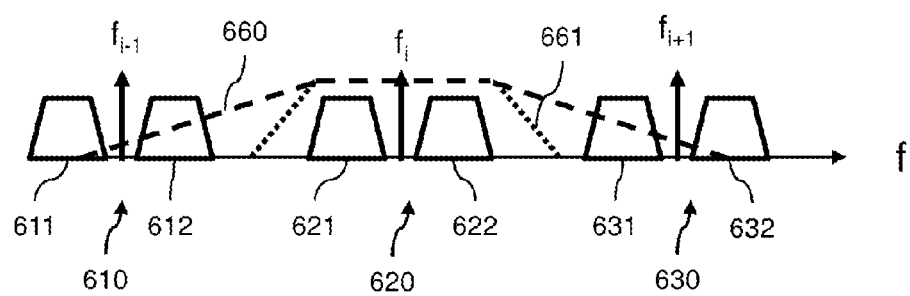
FIG. 8 is a schematic illustration of a plurality of adjacent frequency ranges, on the basis of which the principle of filtering during demodulation is visible.
Figure 9:
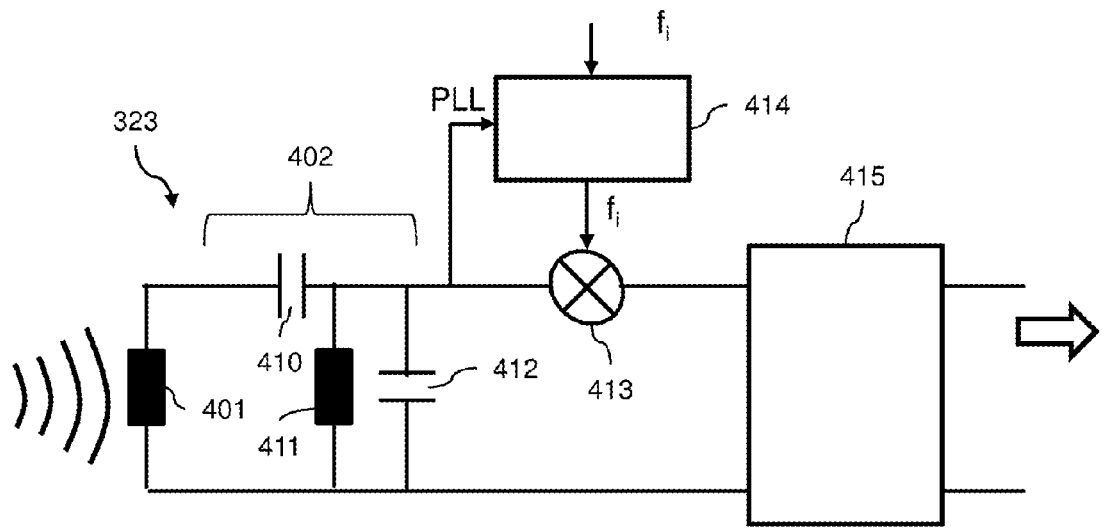
FIG. 9 is a schematic illustration of a reception unit for processing a signal transmitted in the predefined frequency range.

This procedure may be seen on the basis of the three carrier frequencies 610, 620 and 630 and the respectively associated sidebands 611, 612, respectively 621, 622, respectively 631, 632, shown in FIG. 8. It is assumed in this case that the channel i at the carrier frequency $f_i$ or 620 was selected beforehand by the control and communication unit for the transmission of the request signal. Prior to the demodulation, the coarse filtering, already mentioned, is performed with the aid of a bandpass filter having a small slope gradient. To this end, the reception coil 401 may be connected using the connection visible in FIG. 9, consisting of the capacitors 410 and 412 and of the coil 411. The analog filtering results in damping of the frequencies with the characteristic curve indicated with the reference sign 660. The signal damped in this way is supplied to a synchronous demodulator 413 to which the selected carrier frequency $f_i$ is supplied as clock frequency by a settable oscillator 414. The digital signal generated at the output of the synchronous demodulator 413 is supplied to a low-pass filter 415 with a fixed fundamental frequency, as a result of which the damping slope identified with 661 in FIG. 8 is given. This gives a low slope gradient with at the same time low expenditure. The signal present at the output of the low-pass filter 415 is supplied to the determination unit 405 (FIG. 4) for the evaluation of amplitude and identifier.

The signal conditioning unit 402 of the reception unit 323 may be configured so as to receive request signals in a multiplicity of different frequency ranges. To this end, the signal conditioning unit 402 may be matched to the frequency range of a particular request signal, that is to say the frequency range that is predefined by the control and communication unit 360. To this end, the signal conditioning unit 402 may comprise a multiplicity of capacitors connected in parallel, which are able to be connected in parallel using a corresponding multiplicity of switches. By virtue of a changing number of capacitors connected in parallel, the reception circuit (LC circuit) consisting of the coil 401 and the one or more capacitors 410 is able to be adjusted to different frequency ranges.

The evaluation of the signals, the filtering and also the demodulation may be performed digitally. As a result, flexibility may be achieved in the form of software. The interface between hardware and software may be selected as desired. In particular, the slow data rates for identifying the individual measurements are able to be achieved by software without problems. Furthermore, interfering sources are able to be blocked out in a targeted manner by way of the demodulation. In the case of an inductive charging method through the energy transfer between 80 kHz and 90 kHz, these interfering sources are present to a very dominant extent.

Figure 10:
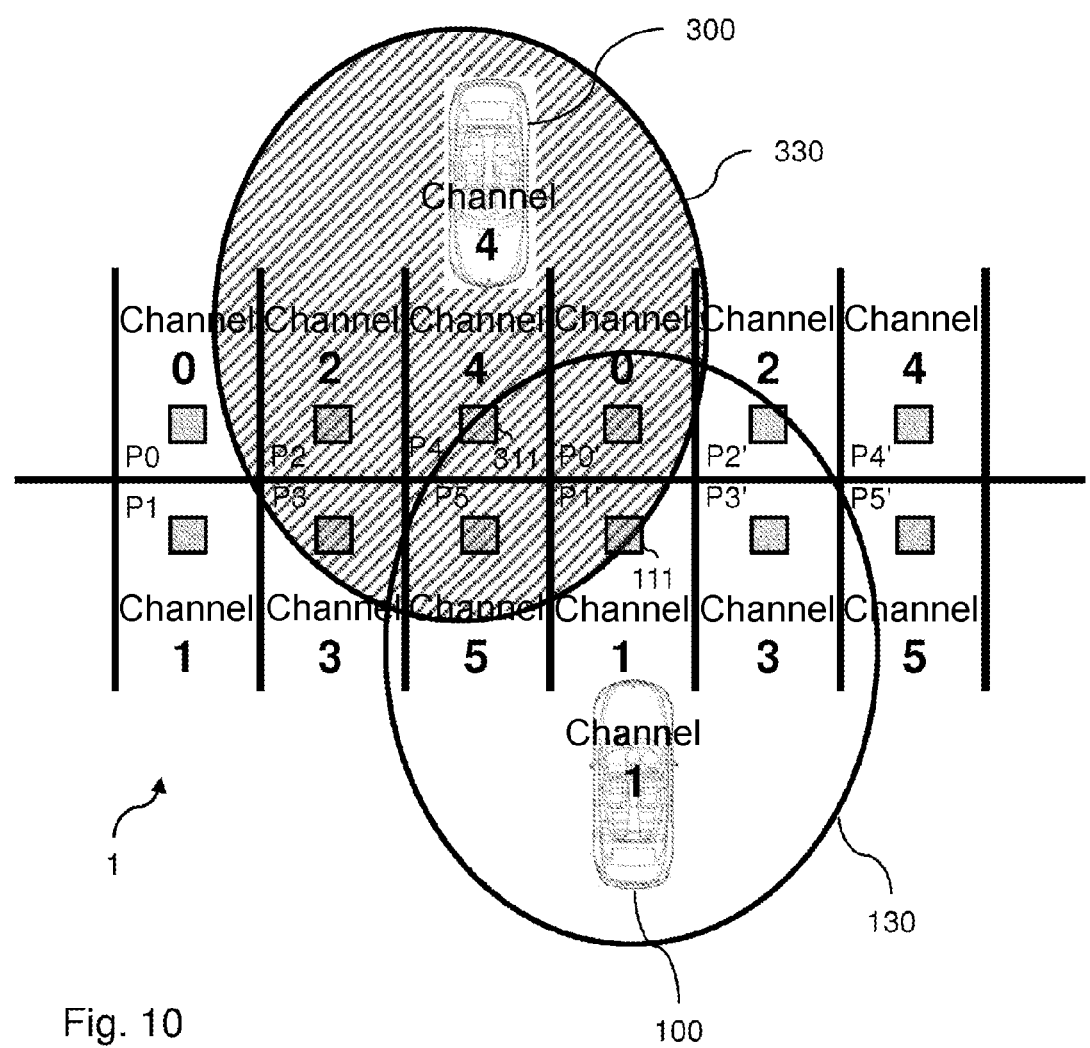
FIG. 10 is a schematic illustration of a charging station facility according to the invention and the principle used to assign selected frequency ranges.

FIG. 10 shows a charging station facility 1 in which by way of example six parking spaces P0, . . . , P5 and P0', . . . , P5', which are arranged opposite one another in pairs, are arranged adjacent to one another. In this case, as is readily able to be seen in FIG. 10, a respective frequency (expressed by channel 0, 2, 4, 1, 3, 5) is fixedly assigned to the respective parking spaces. By way of example, two vehicles 100, 300 drive into laterally offset and opposing parking spaces P1' and P4. Respective regions in which other systems at the same frequency may be subject to interference are illustrated with the ellipsoidal borders 130, 330. In this case, it is readily able to be seen that the vehicle 100 to which channel 1 is assigned is not able to "interfere with" any other parking space having channel 1 on account of the arrangement of the fixed frequencies at respective parking spaces. The same applies for the vehicle 300, to which channel 4 is assigned.

A channel may be assigned to a vehicle approaching the charging station facility 1 such that, when looking for a free charging station, free channels (having the same meaning as free frequency ranges for the transmission of the request signal) are queried cyclically by the control and communication unit 360. By recognizing which charging station the vehicle is approaching (for example through communication between the vehicle and the control and communication unit 360 of the charging station facility 1 or a camera-based system), the channel (frequency range) assigned to the charging station may be transmitted to the vehicle in the message, such that said vehicle directs its communication at the frequency range assigned to the channel.

Figure 11:
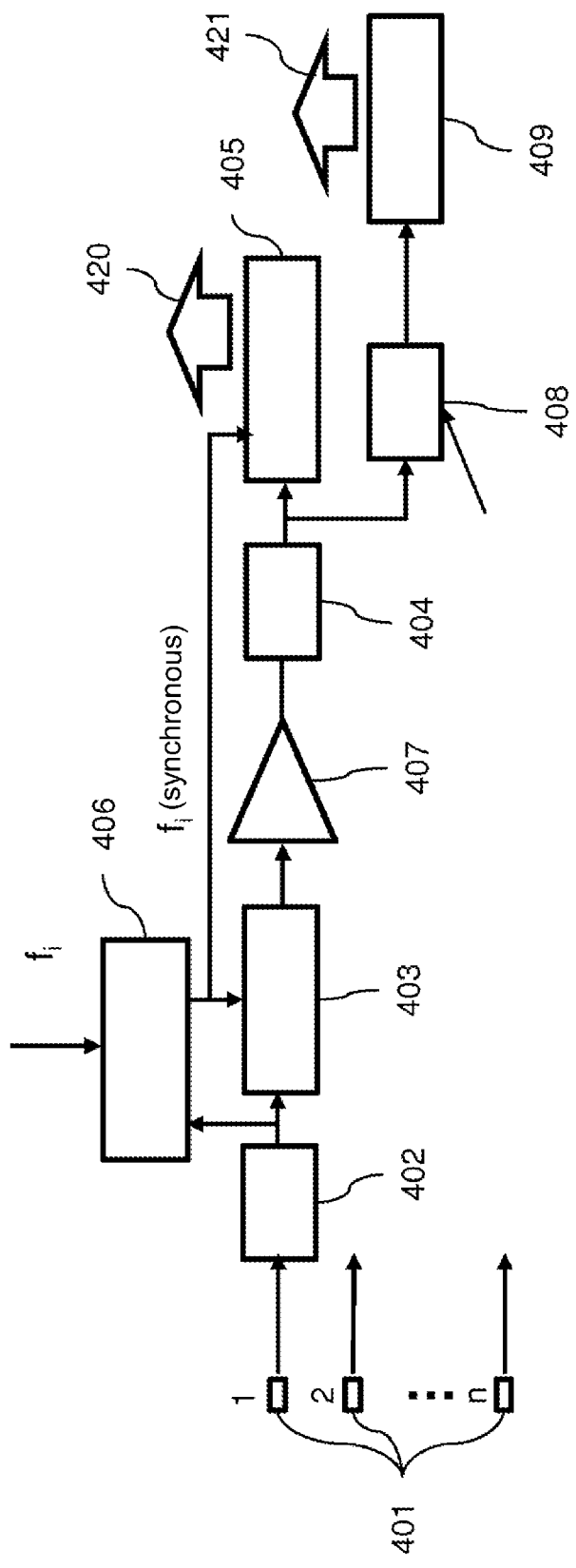
FIG. 11 is a schematic illustration of the processing, performed by a reception unit of a charging station of the charging station facility, of a request signal in a selected frequency range.

FIG. 11 shows a detailed exemplary demodulator. In this case, a single reception coil 401 is in each case assigned elements of the signal conditioning unit 402, of the A/D converter 403, of an amplifier 407, of a filter unit 404, of a phase determination unit 406 to which the selected carrier frequency $f_t$ is supplied, the determination unit 405 and a further filter unit 408 and a further A/D converter 409. Beyond the already described units 402 to 407, the further filter unit 408 having a low-pass filter and the A/D converter 409 are provided for the purpose of measuring the amplitude of the request signal. These additional elements lead to high noise spacings and ranges. Since the filtering takes place essentially on the low-frequency side following the demodulation, instead of a bandpass filter, only a low-pass filter having a significantly smaller slope gradient is necessary, which means lower expenditure. An identifier 420 is then provided in the request signal by the determination unit 405, and a signal strength of the reception coil 401 is provided by the A/D converter 409.

Mutual interference is avoided through the targeted assignment of different frequencies. Due to the low bit rates that are therefore possible for transmitting an identifier, a respective channel may be designed so as to be very narrow. A high signal-to-noise spacing and therefore high measurement accuracy are therefore possible. At the same time, robustness against interfering frequencies, for example the charging frequency range, is increased.

There is no need for a complicated time-multiplexing mechanism if only one frequency channel is used. Due to the flexibility of the method, a standardized solution across all manufacturers is possible.

Furthermore, it is possible to use a positioning technology that is proven in the vehicle and that is independent of environmental influences. Technology that is already present in a vehicle may also be used for vehicle positioning.

A further advantage consists in the robustness against the influencing of keyless access systems by the inductive energy transfer.

LIST OF REFERENCE SIGNS 1 charging station facility
100 vehicle
101 rectifier
102 WPT vehicle unit
103 store (battery)
105 charging controller (WPT controller)
110 charging unit
111 WPT ground unit
112 control unit
113 demodulator
114 signal evaluation unit
120 underbody clearance
201 transmission unit
202 controller
204 reception unit
210 vehicle door
211 door handle
212 sensor
220 key
221 key transmission unit
223 reception unit
300 vehicle
311 charging station
322 reception unit
323 reception unit
350, 351 communication unit
355 control unit
356 modulator
360 control and communication unit
401 reception coil
402 signal conditioning unit
403 A/D converter
404 filter unit
405 determination unit
406 phase determination
407 amplifier
408 filter unit
409 A/D converter
420 identifier
421 signal strength
500 component
501, 502, 503, 504 transfer function
509 frequency
510 capacitor
511 switch
512 blocking circuit
520 damping function
521, 522 frequency range
621, 622 frequency range The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging station facility, comprising:
one or more charging stations for wireless transfer of electrical energy to a respective vehicle, wherein a respective charging station comprises:

(i) a ground unit that is configured to generate an electromagnetic charging field for transfer of electrical energy to the vehicle during a charging procedure; and
(ii) a transmission and/or reception unit that is configured to receive a request signal from a transmission unit of a vehicle or to transmit same to a reception unit of the vehicle, wherein
the request signal is situated in any one of a multiplicity of different frequency ranges, wherein
the multiplicity of frequency ranges are arranged to be evenly distributed in a first or second frequency band and a width of a respective frequency range is roughly 6 times a given fundamental frequency of a signal coding and a spacing between two adjacent frequency ranges is roughly 9 times a given fundamental frequency of the signal coding; and
a control and communication unit that is configured to transmit a message to a control unit of the vehicle and to a control unit of the reception unit of the charging station selected for the charging procedure, the message comprising information as to a selected frequency range in which the request signal is to be transmitted.

2. The charging station facility as claimed in claim 1, wherein
the control and communication unit is configured to transmit the message to the control unit of the vehicle via a communication channel that is situated in a frequency range different from the multiplicity of different frequency ranges in which the request signal is transmitted.

3. The charging station facility as claimed in claim 2, wherein
the control and communication unit is configured to transmit, in respective messages, the use of different frequency ranges to vehicles that are associated with adjacent ground units for the wireless transfer of electrical energy.

4. The charging station facility as claimed in claim 1, wherein
the multiplicity of different frequency ranges is situated in one of two following frequency bands, which are spaced apart from and above and/or spaced apart from and below a predefined charging field frequency range:
(i) the first frequency band between a lower limit value, which is at least 10 kHz higher than an upper limit of an energy transfer frequency range, and 250 kHz;
(ii) the second frequency band between 20 kHz and an upper limit value, which is at least 10 kHz lower than a lower limit of the energy transfer frequency range.

5. The charging station facility as claimed in claim 1, wherein
the request signal comprises a request signal for a keyless access function and/or a keyless engine starting function of a vehicle.

6. The charging station facility as claimed in claim 1, wherein
the transmission and/or reception unit comprises:
a reception unit that is configured to convert an electromagnetic field into an analog electrical signal; and
a signal conditioning unit that is configured to dampen the analog electrical signal in a charging field frequency range of the electromagnetic charging field in relation to the analog electrical signal in the selected frequency range.

7. The charging station facility as claimed in claim 6, wherein the transmission and/or reception unit is configured to match the signal conditioning unit to the frequency range of the request signal.

8. The charging station facility as claimed in claim 7, wherein the transmission and/or reception unit is configured to:
(i) dampen the analog electrical signal in the charging field frequency range in relation to the analog electrical signal in all of the multiplicity of different frequency ranges; and
(ii) dampen the analog electrical signal in the selected frequency range to a lesser extent than in the other frequency ranges of the multiplicity of different frequency ranges.

9. The charging station facility as claimed in claim 6, wherein the transmission and/or reception unit comprises:
an analog-to-digital converter that is configured to convert a signal, derived from the analog electrical signal, into a digital signal;
a filter unit that is configured to highlight the digital signal in the selected frequency range in relation to the digital signal in the other ones of the multiplicity of different frequency ranges; and
a determination unit that is configured to determine a signal strength of a signal at the output of the filter unit.

10. The charging station facility as claimed in claim 9, wherein
the filter unit comprises a digital filter having a fixed fundamental frequency that is a carrier frequency of the selected frequency range.

11. The charging station facility as claimed in claim 1, wherein
the transmission and/or reception unit is configured, in response to the reception of the request signal from a transmission unit of the vehicle to which electrical energy is intended to be transferred via the ground unit, to provide the determined signal strength in order to determine a position of the vehicle in relation to the ground unit.

12. A vehicle, comprising:
a vehicle unit that is configured, during a charging procedure, to receive an electromagnetic charging field from a ground unit of a charging station;
a reception unit that is configured to receive a position determination signal from the ground unit, wherein the position determination signal is situated in any one of a multiplicity of different frequency ranges;
a control unit that is configured to receive a message from a control and communication unit of a charging station facility as claimed in claim 1,
wherein the message comprises information as to the selected frequency range in which a request signal should be transmitted from the vehicle to the reception unit of the ground station, or vice versa.

13. The vehicle as claimed in claim 12, wherein said vehicle comprises one or more transmission units having a respective or a common signal conditioning unit that is configured to convert a digital signal into an analog electrical signal, wherein the signal conditioning unit is configured to be matched to a carrier frequency of the selected frequency range by the control unit.

14. A method for determining a position of a vehicle in relation to a charging station of a multiplicity of charging stations of a charging station facility, wherein the method comprises the steps of:

recognizing an approach of the vehicle to one of the multiplicity of charging stations;

transmitting a message to a control unit of the vehicle via a communication channel that is situated in a frequency range different from a multiplicity of different frequency ranges in which a request signal is transmitted and transmitting the message to a control unit of a reception unit of the charging station selected for a charging procedure, the message comprising information as to a selected frequency range from the multiplicity of different frequency ranges in which the request signal should be transmitted;

transmitting the request signal from the vehicle or the charging station, the request signal being situated in the selected frequency range;

receiving a signal at the charging station or at the vehicle, the received signal comprising the request signal;

conditioning the received signal depending on the selected frequency range of the request signal;

determining a signal strength of the request signal on the basis of the conditioned signal; and determining the position of the vehicle in relation to the charging station on the basis of the determined signal strength.

15. A charging station facility, comprising:

one or more charging stations for wireless transfer of electrical energy to a respective vehicle, wherein a respective charging station comprises:
  (i) a ground unit that is configured to generate an electromagnetic charging field for transfer of electrical energy to the vehicle during a charging procedure; and
  (ii) a transmission and/or reception unit that is configured to receive a request signal from a transmission unit of a vehicle or to transmit same to a reception unit of the vehicle, wherein
    the request signal is situated in any one of a multiplicity of different frequency ranges; and a control and communication unit that is configured to transmit a message to a control unit of the vehicle via a communication channel that is situated in a frequency range different from the multiplicity of different frequency ranges in which the request signal is transmitted and configured to transmit the message to a control unit of the reception unit of the charging station selected for the charging procedure, the message comprising information as to the selected frequency range in which the request signal is to be transmitted.

* * * * *